Figure 1:
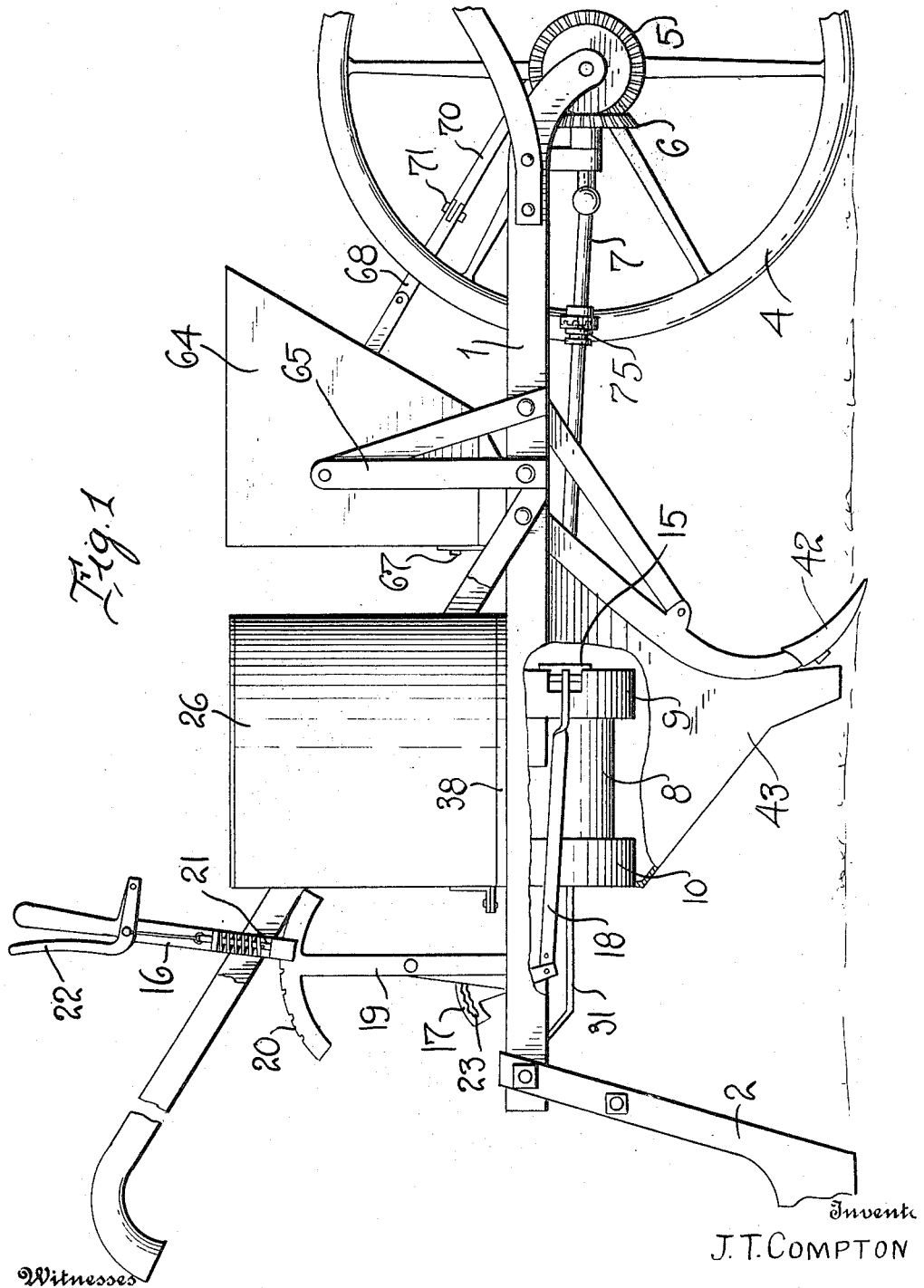

J. T. COMPTON.
SEED PLANTER.
APPLICATION FILED NOV. 9, 1914.

1,168,859.

Patented Jan. 18, 1916.
4 SHEETS—SHEET 1.

Witnesses
Robert M. Sutphen
A. J. Hind

Inventor
J. T. COMPTON

By Watson E. Coleman
Attorney

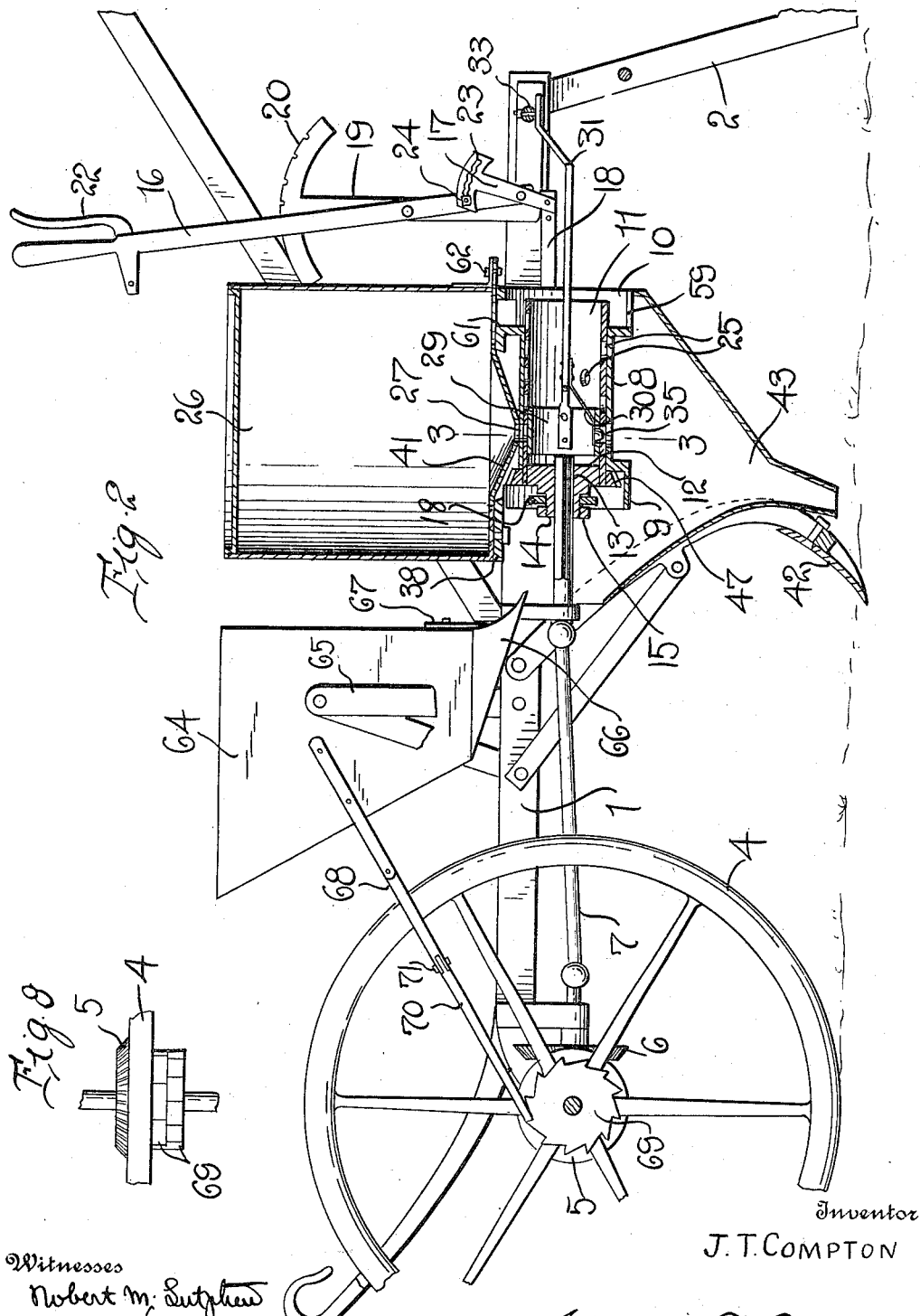

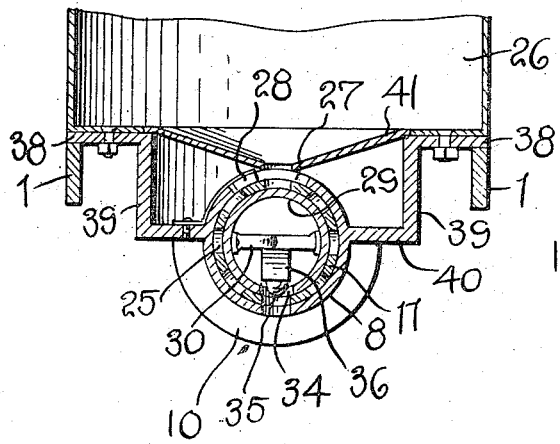
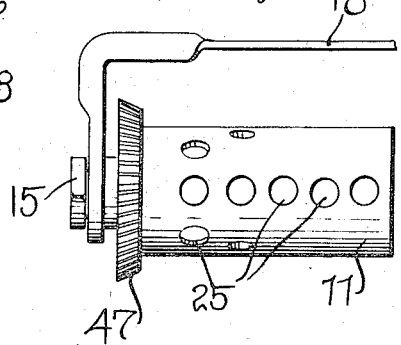
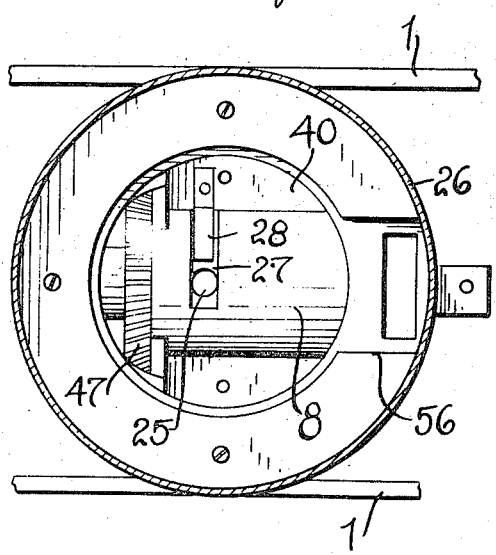
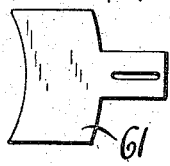
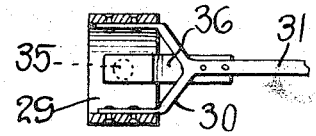

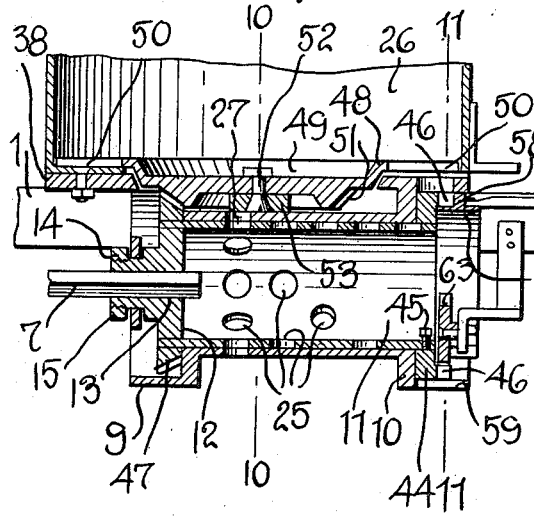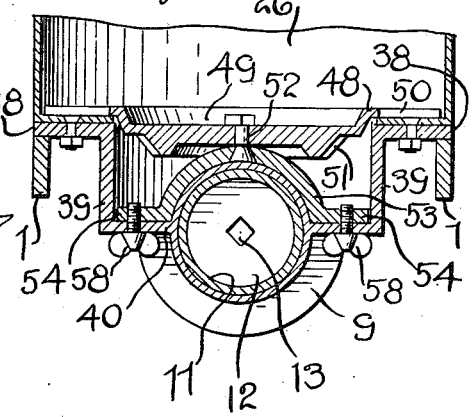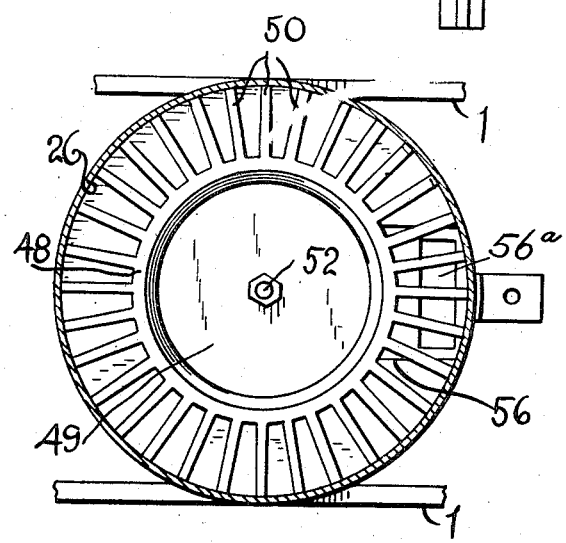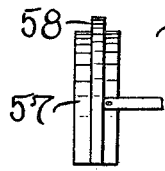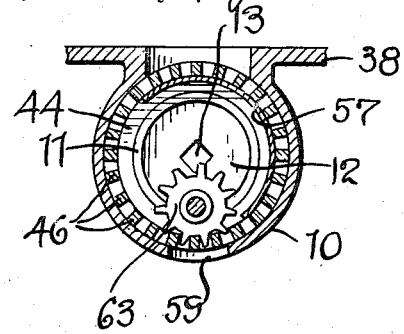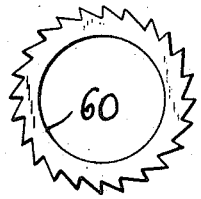

UNITED STATES PATENT OFFICE.

JOHN T. COMPTON, OF LINEVILLE, ALABAMA.

SEED-PLANTER.

1,168,859.

Specification of Letters Patent.

Patented Jan. 18, 1916.

Application filed November 9, 1914. Serial No. 871,131.

*To all whom it may concern:*

Be it known that I, JOHN T. COMPTON, a citizen of the United States, residing at Lineville, in the county of Clay and State of Alabama, have invented certain new and useful Improvements in Seed-Planters, of which the following is a specification, reference being had to the accompanying drawings.

This invention relates to new and useful improvements in agricultural implements, and particularly to seed planting mechanism.

The primary object of the invention is the provision of a machine which may be used either for planting corn or seeds of like character, or for planting cotton.

A further object of the invention is to provide a machine of this character which may be readily converted from a corn planter to a cotton planter, or vice versa; and still another object of the invention is the provision of a rotary seed planter operated by means of a traction or ground wheel, said seed carrier being formed with a plurality of sets of seed pockets, and being shiftable so as to bring any one of the several sets into operative position.

A further object of the invention in this connection is to so construct the seed carrier that it may be readily shifted by hand, and while the machine is moving over the ground, so as to permit the easy and quick regulation of the amount of seed discharged according to the fertility of the soil.

Still another object of the invention is the provision of means whereby only a portion of any one pocket or series of pockets may be disposed to receive seeds, so as to increase or decrease the number of seeds disposed in any pocket.

Still another object of the invention is the provision in connection with the rotary seed carrier first described of a seed carrier peculiarly adapted for planting cotton either in rows or broadcast, and of an agitator which, when disposed within the seed carrier or container, agitates the contents thereof, places the cotton seed over the opening through which it passes to the cotton seed carrier, and obstructs the opening through which the corn passes to the corn dropper or carrier.

Still another object of the invention is to improve upon the details of construction of mechanism of this character, adding to its efficiency and economizing the cost of construction.

Other objects will appear in the course of the following description.

My invention is illustrated in the accompanying drawings, wherein—

Figure 1 is a side elevation of a seed planter constructed in accordance with my invention; Fig. 2 is a side elevation reverse to that of Fig. 1, the planting mechanism and the container being shown in section; Fig. 3 is a transverse sectional view on the line 3—3 of Fig. 2; Fig. 4 is an elevation of the seed carrier 11; Fig. 5 is a plan view looking toward the bottom of the container; Fig. 6 is a detail view of the shield for closing off the opening leading to the cotton seed planting devices; Fig. 7 is a sectional view of the annulus 29 used in connection with the seed carrier; Fig. 8 is a detail top view of the traction wheel and its shaft with the gear wheel and ratchet wheels thereon; Fig. 9 is a longitudinal section of the rotatable carrier, its casing and a portion of the container, showing the mechanism arranged for planting cotton seed; Fig. 10 is a section on the line 10—10 of Fig. 9; Fig. 11 is a section on the line 11—11 of Fig. 9; Fig. 12 is a plan view of the agitator, the container being shown in section; Fig. 13 is a face view of another form of said carrier; Fig. 14 is a detail view of the shield 57 used in connection with the seed carrier shown in Fig. 11.

Corresponding and like parts are referred to in the following description and designated in the accompanying drawings by like reference numerals.

Referring to the drawings, it will be seen that the frame of the machine includes the longitudinally extending side bars 1, to the rear of which are operatively secured the downwardly and rearwardly extending covering blades 2, and to the forward portion of which are secured the upwardly and rearwardly extending handles. These handles may be supported upon the frame of the machine in any suitable manner, and may be arranged as is customary in walking seed planters and similar constructions. The forward end of the frame is supported upon the relatively large ground or traction wheel 4 which is mounted in a suitable shaft journaled in bearings in the extremity of the frame, and which is provided with a beveled gear 5 which in turn meshes with a beveled gear 6 on the forward end of a longitudinally disposed drive shaft 7. This drive shaft 7 is preferably formed in sections, the sections being swiveled to each other so as to permit the traction wheel 4 to be disposed in the median plane of the planter and to permit the drive shaft also to be disposed in the median plane of the planter. The shaft 7 at its rear end is square or many-sided in cross-section, for a purpose to be later stated.

Supported upon the frame of the cultivator in any suitable manner and between the side bars 1 is a cylindrical casing 8 open at opposite ends and having each end enlarged as at 9 and 10, respectively. The intermediate portion of the casing 8 is uniform in diameter, and disposed within this casing and rotating therein is a cylindrical seed carrier 11. The cylinder 11 forming the seed carrier is closed at one end as at 12 by a head, this head being provided at its center with a squared aperture 13 into which the squared end of the shaft passes. The head 12 carries upon it and surrounding this aperture the hub 14 having the nut 15 applied thereto.

The cylinder 11 is rotated within the sleeve-like casing 8 by the rotation of the shaft 7, and is longitudinally shifted with relation to the casing by means of a lever 16 which is pivotally supported at the rear of the frame, the lower end of the lever being adjustably connected to a sector piece 17 which in turn is pivotally connected to a link 18 which extends forward and is bent around the end of the cylindrical casing and engaged with the hub 14 and behind the head or nut 15. The engagement of the link 18 with the head of the sleeve is such that the sleeve may be readily turned or may be shifted longitudinally upon the oscillation of the lever 16.

As illustrated, the lever 16 is pivoted upon the upright 19, the upper end of which carries a toothed sector 20. The lever is provided with the common detent 21 engaging the teeth of the sector, this detent being raised out of engagement with the sector teeth by means of the hand grip 22. The sector plate 17 previously referred to is pivoted at its center to the lower end of the lever, and the upper or larger end of the sector plate is slotted as at 23. This slot is formed with corrugated walls and a bolt 24 passes through the lever through this slot so as to hold the sector plate set in any desired relation to the lever. The purpose of this adjustable sector plate will be later stated.

The rotatable cylindrical carrier 11 is provided with a plurality of sets of seed pockets, designated 25. The several sets differ from each other merely by the fact that the seed pockets are set farther apart or closer together. In one set there is only one seed pocket; in another set there are two seed pockets set diametrically opposite each other, and in the third and fourth sets there are a still greater number of seed pockets. These several sets of seed pockets, depending upon the position of the cylindrical carrier 11, are adapted to receive the seed from the seed container 26 through an opening 27 formed in the upper wall of the casing 8, which upper wall, together with the wall 39 to be later described, forms the bottom of the container. The opening 27 has the form of an arcuate slot, a portion of this slot being closed by a resilient finger 28 whose end is enlarged so as to fit within the slot. This resilient finger yields to permit the passage of seeds which have become elevated within the pocket and which would be crushed were a solid wall presented to the advancing seeds. If the cylinder 11 is so shifted that the one seed pocket is brought into alinement with the opening 27, then as the cylinder revolves only one parcel of seeds will be discharged for each revolution of the cylinder. If, however, the cylinder is so shifted that the set including two seed pockets is brought into alinement with the opening 27, then two lots of seeds will be deposited for each revolution of the cylinder, and so on. While I do not wish to limit myself to any specific ratio of movement between the driving wheel 4 and the cylinder 11, I have illustrated the cylinder as being rotated at the same speed as the driving wheel, as this provides for a convenient calculation by the operator as to the distance between plantings.

The seed pockets 25 extend entirely through the cylinder 11, and in order to prevent the seed dropping into the interior of the cylinder I provide within the cylinder a circular shield plate designated 29. This shield plate is supported on a yoke 30 in turn attached to or forming a part of a longitudinally extending rod 31 which extends out through the rear end of the casing and through the rear end of the cylinder and is bolted or otherwise attached to a cross bar or bolt 33. The annulus or shield plate 29 at one point of its circumference is provided with an opening 34 which has a diameter slightly larger than the diameter of the seed pockets in the cylinder 11, and projecting through this opening 34 is an ejecting stud 35, the lower face of which is rounded, this stud 35 being attached to a spring 36 which in turn is attached to the shank 31. It will be seen now that this shield plate 29 forms the inside wall of the several pockets and thus prevents the seed from dropping through these pockets into the cylinder, and that when the cylinder 11 revolves to such position as to bring one of the seed pockets into alinement with the opening 37 formed in the lower wall of the casing 8, the ejecting stud 35 will spring into the seed pocket and force any seed contained therein out through the opening 37, thus preventing the seeds becoming choked within the seed pocket and thus not dropping out properly.

The container 26 may be of any suitable construction and at its lower end is inwardly flanged to rest upon an outward extending flange 38 carried upon and preferably formed integral with the casing 8, this flange resting upon the enlarged portions 9 and 10 of the casing 8. The space on each side of the casing 8 is inclosed by a wall 39 having inwardly turned flanges 40 which extend to the surface of the casing 8. A false bottom 41 is detachably mounted within the bottom of the container to prevent leakage of seed into the space on each side of the casing 8. The false bottom 41 has the form of an inverted frusto-cone which is provided with an opening disposed in alinement with the slot 27 and discharging thereinto.

An opening foot 42 is used for the purpose of opening a furrow into which the seed may be dropped, this foot being attached in any suitable manner to the frame of the machine in advance of the planter mechanism, and from the casing 8 extends downward and forward a funnel or chute 43, whereby the seed may be guided into position immediately behind the foot.

The operation of my device as a corn planter will be obvious from what has gone before. The container 26 is to be filled with seed; the operator then forces the planter forward and as the traction wheel revolves the feed cylinder or carrier 11 will also be revolved and the seed pockets of one set of pockets will be brought successively to the opening 27, the seed will be carried around in the pocket until the opening 34 is reached, whereupon the seed will be ejected by the ejector 35. As before stated, the number of plantings made within a certain distance may be regulated by shifting the feed cylinder or carrier forward or rearward within the casing 8 so as to bring one or the other of the sets of pockets into alinement with the openings 27 and 34. Inasmuch as the cylinder is splined upon the shaft 7 it will be obvious that the operator may shift the lever 21 and thus shift the cylinder while the machine is in operation. Thus he can at any time change the rate of planting without stopping the machine, so that this rate of planting may correspond to the fertility of the ground or other conditions which require variations in planting.

In order to adapt my machine for the planting of cotton seed, I provide a feed wheel or seed carrier 44 which is disposed within the enlargement 10 in the casing 8 and abuts against the vertical wall of this enlargement. This feed wheel is detachably mounted upon the rear extremity of the cylinder 11 by means of set screws 45, the set screws passing through the wall of the cylinder and engaging the annular feed member 44 so as to hold it in place. This member is in the shape of a crown gear, that is, has a plurality of teeth 46 projecting in a direction parallel to the axis of rotation. Also carried upon the cylinder 11 and rotating therewith is a beveled gear wheel 47 whose teeth intersect an opening formed in the bottom of the container previously mentioned. The agitator 48 is adapted to be disposed within the container and supported for rotation upon the casing 8, this agitator having an outside diameter nearly as large as the diameter of the container, and comprising a dished plate 49 having radially projecting fingers 50. A beveled gear wheel 51 is formed upon the under face of the dished plate, and this beveled gear wheel is adapted to mesh with the beveled gear wheel 47 when the agitator is in position. The agitator is rotatably mounted by means of a bolt 52 upon a saddle plate 53, the extremities of which are laterally bent as at 54, these laterally bent terminals being engaged by set screws 58 extending upward through the bottom of the housing on each side of the casing 8.

By reference to Fig. 5, it will be seen that the inwardly turned flange at the lower end of the body of the container is cut away as at 56 and that the wall of the enlargement 10 at the top of the casing 8 is likewise cut away 56$^a$ to correspond. Thus it will be seen that the bottom of the hopper, which is formed by the webs 39 and 40 and the casing 8, is provided with an opening 56$^a$ whereby communication is established between the interior of the container and the seed carrier or dropper 44. The teeth 46 on the feed member 44 pass beneath this opening 56$^a$ and thus receive the seed from the container, the agitator 48 in its revolution preventing the seed from becoming choked within the container. Supported within the annular series of teeth 46 is an arcuate shield plate 57 having an outwardly projecting flange 58, this flange bearing against the ends of the gear teeth 45 and the shield 57 bearing against the inside faces of the teeth. Thus the teeth form pockets which are closed at both ends and at the bottom. The shield 57 extends to any angular distance required. The lower wall of the enlargement 10 is cut away as at 59 to permit the dropping out of the seed into the chute 43.

It will be seen that where the device is used as a cotton seed planter the pockets formed in the cylinder 11 are not used and that these pockets and the opening through which the seed contained within the container is ordinarily discharged into these pockets is closed by the agitator 48. The cotton seed is directed by the agitator down through the opening 56ª formed in the bottom of the container and upper wall of the enlargement 10 onto the wheel 44 and is carried around by the teeth and then dropped.

Where it is desired to strew cotton seed instead of dropping it, a feed member or carrier is used such as that illustrated in Fig. 13. This feed wheel or carrier is designated 60 and comprises an annulus having its outer face formed with a series of teeth, one face of each tooth being inclined.

While I have illustrated two forms of seed carrier members 44 and 60, I wish it understood that other forms might be used and that several different forms may be readily interchanged whenever desired to vary the manner in which the seed is dropped or deposited. A shield plate 61 is used when the planter is in use to plant corn, this shield plate being inserted through the front wall of the container at the bottom thereof and extending over the opening 56ª in the head 10 so as to prevent the seed from passing through this opening. This shield plate is held in place by means of a set screw 62 or in any other suitable manner.

The purpose of the sector plate 23 is to provide for the adjustment of the link 18 and therefore of the feed cylinder 11 relative to the lever 16. In the ordinary adjustment of the lever 16 a movement of the lever one tooth on the rack 20 will shift the cylinder 11 a distance just sufficient to bring one set of seed pockets into alinement with the discharge opening in the bottom of the container and a further movement of the lever one tooth on the rack will bring a second set of feed pockets into alinement with the opening. These feed pockets are formed of such area that a number of seeds will be contained in each pocket, and in order to diminish the number of seeds which may be received in each pocket I provide the sector plate 23. By adjusting this plate 23 the relation of the throw of the cylinder 11 and the throw of the lever 21 will be so varied that instead of a throw of the lever bringing a series of pockets into full registration with the opening leading to the container, it will only bring it into half registration or even a less amount, so as to allow only a few seed grains or even just one grain alone to pass into any seed pocket. Thus the number of seeds to be planted may be approximately controlled as well as the distance between plantings.

In order to force the seeds from between the teeth 46 on the annular carrier 44, I preferably mount in line with these teeth and with the carrier 44 a toothed wheel 63 which is loosely mounted upon a shaft and whose teeth mesh with the teeth of the carrier 44 and push the seeds carried by the pockets formed between said teeth 46 downward onto the ground. I do not wish to limit myself to this particular form of ejector, as it is obvious that other forms might be used and be within the obvious purview of my invention.

It will be seen that I have provided in the mechanism before described, a seed planter of simple construction and which may be easily operated, and in which planting of the seed may be varied without stopping the planter and by simply adjusting the feed cylinder by means of the lever 21.

It will be obvious that when my device is used as a planter for corn or other seeds dropped at intervals, the pockets in the seed carrier 11 will act to space the lots of seeds at predetermined distances apart, and in line with the furrow opener 42. When the seed dropper or carrier 40 is used, however, the seeds will be dropped in a relatively thin and continuous line, the seeds in both instances being covered by the blades 2 as the planter moves along.

While I do not wish to be limited to its use, I preferably mount upon the frame supporting the seed container and forward of the seed member a guano or fertilizer hopper designated 64 and provide means whereby a small amount of fertilizer may be distributed upon the ground with the seed. To this end I mount the hopper 64 pivotally upon the upper ends of standards 65 of any usual or suitable construction, the pivotal axis of the hopper 64 being such that the greater portion of the weight of the hopper is forward of the pivot. The lower end of the hopper is provided with a discharge nozzle 66 which discharges into the upper end of the chute 43 and which is provided with a sliding gage plate 67 which may be adjusted to reduce or increase the amount of fertilizer discharged from the fertilizer hopper. The fertilizer hopper is oscillated by means of a downwardly and forwardly extending rod 68 which at its lower end engages with a ratchet wheel 69 carried upon the shaft of the forward wheel 4 on the side of the wheel opposite from the gear wheel 5. This ratchet wheel upon a rotation of the traction wheel 4 will jolt the hopper and shake the fertilizer therefrom. In order to provide means whereby the hopper may receive a greater or a less number of oscillations upon each rotation of the wheel 4, I preferably provide a plurality of ratchet wheels 69, each being formed with differently spaced teeth and provide the lower end of the arm 68 with a hinged terminal end 70 which may be adjusted laterally so as to engage in one of the ratchet wheels, this terminal end being held in its adjusted position by means of a nut or bolt 71.

It will be noted that the agitator is dished. The dished form of this agitator is for the purpose of holding degenerate seed which always works to the bottom and center of the seed hopper. By carefully emptying the agitator several times a day, the cotton seed will be very greatly improved in quality, that is, provided the seed does not get too low in the container. When all seeds are to be planted from the container, a cone made of tin or other suitable metal can be fastened to the agitator so as to cover the pan formed by its depressed portion, thus causing all of the seed to be caught in the teeth of the agitator and to be directed to the feeding outlet.

By providing means either for sowing, that is, scattering cotton seed, and means for dropping the seed, I provide for the necessary differences in planting due to differences in soil. Thus where the soil becomes crusted after planting, a relatively considerable amount of seed is necessary to be planted in order to raise the crusted soil and unless the crusted soil is so raised before the ground is thoroughly warm, the plants will die. In other cases, the cotton seed dropper is used which should be arranged to drop the seeds an inch and a half apart, thus no two plants are jammed close to each other and this makes it easier to chop the cotton and further makes it possible to use a cotton chopping machine.

It is, of course, to be understood that I provide means whereby the gearing may be thrown out of engagement with the driving gears 5 and 6 when the machine is being shifted to or from place where the seed is to be planted. Any suitable mechanism may be provided for this purpose, but I have illustrated in Fig. 1 a clutch 75 which is adapted to be operated as usual by a shift rod under control of the operator.

While I have illustrated my invention as applied to a seed planting mechanism which is adapted to be pushed, I wish it to be distinctly understood that the same mechanism may be used in connection with riding planters of any variety.

Having thus described my invention, what I claim is:

1. In a planting mechanism, a rotatable cylindrical seed dropper having a circumferentially extending series of seed pockets, a casing inclosing the dropper and having a receiving opening and a discharge opening with which said pockets are adapted to register, an annular seed dropper carried upon one end of the cylindrical dropper and having a circumferential series of pockets, a container, and means whereby seed may be directed from the container either to the first named seed pockets or the second named seed pockets.

2. In a planting machine, a driving shaft, a cylindrical member mounted upon the driving shaft for rotation therewith, an annular seed dropping member mounted upon one end of the cylinder and having a circumferential series of pockets, a gear wheel mounted upon the shaft, a container having its bottom cut away above the gear wheel and having an opening disposed over the annular seed dropping member, and a rotatable agitator detachably mounted within the container and having gear teeth meshing with the gear teeth on said gear wheel.

3. In a planting machine, a rotatable shaft, a cylinder mounted upon the shaft for rotation therewith, a gear wheel formed at one end of the cylinder and through which the shaft passes, an annular seed dropper mounted upon the other end of the cylindrical member, a container disposed over the cylindrical member and having an opening through which the gear wheel projects, and an opening registering with the seed dropper and an agitator detachably mounted within the container and meshing with said gear wheel.

4. In a planting machine, a rotatable cylindrical seed dropper having a plurality of circumferential series of pockets, a shaft upon which the seed dropper is mounted for independent longitudinal movement but unitary rotation, an annular seed dropper detachably mounted upon one end of the cylindrical seed dropper and having a circumferential series of pockets, a container mounted over the cylindrical seed dropper and extending over the annular seed dropper, said container having an opening above the cylindrical seed dropper and an opening above the annular seed dropper, means for closing said last named opening, means adapted to be disposed within the container for directing seed to one of said series of openings, and an agitator disposed within the container for rotation in a horizontal plane, said agitator being adapted to be operatively engaged by and rotated with said shaft, said last named means and agitator being interchangeable, and means for shifting the cylindrical seed container longitudinally along the shaft to bring any one of the desired series of openings in operative position with relation to the first-named seed directing means.

5. In a planting mechanism, a supporting frame including a cylindrical casing formed with diametrically disposed upper and lower receiving and discharge openings, one end of the casing being formed with an annular flange, a container for which the casing forms a bottom, that portion of the casing forming the bottom of the container being cut away at the middle of the container and adjacent the margin thereof, a driving shaft extending into the cylindrical portion of the casing, a rotatable cylindrical seed dropper and carrier mounted within the cylindrical casing and having a plurality of series of seed pockets, the seed dropper being longitudinally shiftable upon the casing to thereby bring any one of said series of pockets into alinement with the receiving and discharge openings of said casing, a gear wheel mounted upon the cylindrical seed dropper and normally disposed beneath the central opening in the bottom of the container, an annular seed dropper detachably mounted upon the end of the rotatable seed dropper and when in place bearing against the flange of the casing, said second-named seed dropper being beneath the opening on the margin of the container, means for closing this marginal opening, a false bottom adapted to be disposed within the container and formed to direct the seed from the container to the receiving opening of the casing, and an agitator adapted to be disposed within the container and interchanged for the false bottom and adapted to be engaged by the gear wheel.

6. In a planting mechanism, a seed container, a member forming the bottom of the container and having a receiving opening and including a cylindrical casing having a discharge opening, a web extending upward from the casing and then flanged laterally to the wall of the container, the upwardly extending portion of the web defining a circular recess of relatively large size, the outwardly directed flange of said web having a discharge opening, a cylindrical seed carrier and dropper mounted in the casing and carrying a gear wheel at one end, the floor of said recess having an opening beneath which the gear wheel is disposed, said seed carrier coacting with the discharge opening in the casing, a driving shaft operatively connected with the cylindrical dropper and carrier, an annular dropper and carrier mounted upon the opposite end of the cylindrical dropper and disposed beneath the second named discharge opening, and a dish-shaped imperforate agitator adapted to be detachably mounted upon said casing to form the bottom of the container and extend across the recess of said bottom member and prevent passage of seed therethrough and having radial arms extending out to the wall of the container and acting to direct the seed to the second named discharge passage.

7. In a planting mechanism, a seed container, a member forming the bottom of the seed container and comprising a cylindrical casing having a seed discharge opening and an upstanding web disposed concentric to said opening and formed with a laterally directed flange engaging and supporting the wall of the container, said upstanding web defining a circular recess of relatively large size, said upstanding flange being formed with a seed discharging opening, said cylindrical casing at one end being annularly enlarged and the last named discharge opening being disposed above said enlargement, a cylindrical seed dropper mounted within the casing and having a gear wheel at one end and provided with seed receiving pockets coacting with the first named seed discharge opening, an annular seed dropper also mounted upon the cylindrical dropper and disposed within said annular enlargement of the casing, a shaft operatively connected to and driving the cylindrical dropper, means for closing the opening into the annular enlargement of the casing, a detachable conical false bottom adapted to be disposed within the relatively large recess in the bottom member of the container and having a central discharge opening registering with the receiving opening and coacting with the first named seed discharge opening to direct seed thereto, and a detachable rotatable agitator interchangeable with said false bottom adapted to be mounted upon said cylindrical portion of the casing and having a diameter equal to the diameter of the recess in the bottom of the container, said agitator having radially directed fingers moving over the laterally directed flange of the upstanding web and thereby adapted when employed to direct the seed to the opening in said flange, said agitator being engaged and driven by the gear wheel.

In testimony whereof I hereunto affix my signature in the presence of two witnesses.

JOHN T. COMPTON.

Witnesses:
W. H. RIDDOCH,
A. L. LANGSTON.